US011621966B1

(12) United States Patent
Yu et al.

(10) Patent No.: US 11,621,966 B1
(45) Date of Patent: Apr. 4, 2023

(54) DETECTION OF MALICIOUS USER ACCOUNTS OF AN ONLINE SERVICE USING FEATURE ANALYSIS

(71) Applicant: DataVisor, Inc., Mountain View, CA (US)

(72) Inventors: Fang Yu, Sunnyvale, CA (US); Olivia Wang, Fremont, CA (US)

(73) Assignee: DataVisor, Inc., Mountain View, CA (US)

( * ) Notice: Subject to any disclaimer, the term of this patent is extended or adjusted under 35 U.S.C. 154(b) by 435 days.

(21) Appl. No.: 16/794,159

(22) Filed: Feb. 18, 2020

Related U.S. Application Data (60) Provisional application No. 62/806,344, filed on Feb. 15, 2019.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
CPC .............................. H04L 63/1416; G06N 20/00
See application file for complete search history.

(56) References Cited

U.S. PATENT DOCUMENTS

| 9,870,465 | B1 * | 1/2018 | Levi ...................... H04L 67/306 |
| 10,110,616 | B1 * | 10/2018 | Xie ...................... H04L 63/1425 |
| 10,721,236 | B1 * | 7/2020 | Kronrod ................ H04L 63/102 |
| 10,762,439 | B2 * | 9/2020 | Cao .......................... G06N 5/022 |
| 11,112,768 | B2 * | 9/2021 | Kubo ...................... G06N 5/045 |
| 2018/0225709 | A1 * | 2/2018 | Ferber ................ G06Q 30/0246 |
| 2018/0288063 | A1 * | 3/2018 | Koottayi ................. G06F 15/76 |
| 2018/0270213 | A1 * | 9/2018 | Tsubouchi ............. G06N 20/00 |
| 2019/0156366 | A1 * | 5/2019 | Wilson .................... G06N 7/005 |
| 2019/0303771 | A1 * | 10/2019 | Soong ................. G06F 16/2379 |
| 2020/0186544 | A1 * | 6/2020 | Dichiu ................ H04L 63/1416 |
| 2020/0351285 | A1 * | 11/2020 | Eisenkot ............... G06F 21/554 |

(Continued)

OTHER PUBLICATIONS

Casas P, Mazel J, Owezarski P. Unada: "Unsupervised network anomaly detection using sub-space outliers ranking". In International conference on research in networking May 9, 2011 (pp. 40-51). Springer, Berlin, Heidelberg (Year: 2011).*

(Continued)

*Primary Examiner* — Catherine Thiaw
(74) *Attorney, Agent, or Firm* — Fish & Richardson P.C.

(57) ABSTRACT

Methods, systems, and apparatus, including computer programs encoded on computer storage media, for fraud detection. One of the methods includes partitioning a feature space into a plurality of sub feature spaces, wherein the feature space comprises features associated with user account events for an online service; generating one or more clusters of users for each of one or more sub feature spaces; comparing a feature profile of one or more of the clusters with a global feature profile to determine features of one or more the clusters that have concentrated key values that exceed a respective threshold value; for each of the one or more clusters, scoring the cluster including aggregating the degree to which the key values for features exceed the corresponding threshold values; and based on the scores of the one or more clusters, determining one or more fraud detection actions.

26 Claims, 4 Drawing Sheets

(56) References Cited

U.S. PATENT DOCUMENTS

2020/0356873 A1* 11/2020 Nawrocke ......... G06F 16/24556
2021/0097335 A1* 4/2021 Scriven ................. G06N 20/00

OTHER PUBLICATIONS

K. Flanagan, E. Fallon, P. Connolly and A. Awad, "Network anomaly detection in time series using distance based outlier detection with cluster density analysis," 2017 Internet Technologies and Applications (ITA), 2017, pp. 116-121 (Year: 2017).*

* cited by examiner

DETECTION OF MALICIOUS USER ACCOUNTS OF AN ONLINE SERVICE USING FEATURE ANALYSIS

CROSS REFERENCE TO RELATED APPLICATIONS

This application claims the benefit under 35 U.S.C. § 119(e) of the filing date of U.S. Patent Application No. 62/806,344, which was filed on Feb. 15, 2019, and which is incorporated here by reference.

BACKGROUND

This specification relates to online fraud detection.

Online fraud flourishes as online services become ubiquitous in our daily life. Malicious activities are present in industries including, for example, social networks, dating apps, e-commerce websites, mobile games, credit card agencies, online banks, and insurance companies. Fraudsters often commit fraud by creating fake accounts or taking over existing user accounts. With those accounts they can, for example, write fake product reviews, send false information to other users, pretend to sell nonexistent products, spend money from stolen credit cards, or file fake insurance claims. In short, the diversity and sophistication with which online fraud is committed, and the prevalence of it, call for an efficient and widely applicable approach to detect fraudulent behaviors and fraudulent users.

Most existing fraud detection systems, however, fail to address the following two fundamental challenges when fighting fraudulent behaviors:
1. They often require a complete set of labels provided before proceeding with real detection. In other words, they rely on knowing a large amount of users to be good or bad beforehand to train their supervised machine learning models. In reality, such information is seldom readily available. Acquiring it can be prohibitively expensive.
2. They often build their models on an user-by-user, or event-by-event basis. This means that they only work at an individual level, despite the fact that fraudsters almost always work in clusters and in large scale to make their attacks profitable.

SUMMARY

This specification describes techniques for addressing the above issues using a campaign-level detection mechanism that detects bad campaigns through a careful comparison: if user behavior in a certain campaign displays abnormal correlations, this campaign tends to be a cluster of bad user accounts employed in a malicious attack. A campaign-level detection mechanism, including feature analyzing techniques, as described in this specification can be used to generate an automated, unsupervised fraud detection system that can avoid common pitfalls in other systems.

The campaign-level detection methods do not rely on labels, and as such fall into the family of unsupervised detection. However, the techniques described in this specification are drastically different from traditional unsupervised algorithms, for example, anomaly detection or traditional K-mean clustering.

In anomaly detection, if user account registered with certain blacklisted email provider pops up, a fraud detection system would block this user account. In other cases, if the velocity of certain activities under monitoring surpasses a given threshold, the system would raise red flag. Such a system would work in certain simple circumstances, but it has two notable drawbacks. The first is that it could have high false positive rates. For example, when there is a flash crowd event, e.g., new type of mobile phone launching, it is normal to have a spike on new devices. Second, as the information technology companies employ to build their systems evolves, so does the pattern of fraudulent behavior. This means a cookie-cutter approach where the rules are predetermined and seldom change is not able to adapt fast enough to the changing transgression patterns. Also, a system that's largely based on human design cannot be immune to human biases and errors. All of these demonstrate that a rule-based system, although simple to deploy, is not the most ideal fraud detection system.

Another camp of fraud detection leverages clustering analysis in unsupervised machine learning, for example, using K-means clustering and K-nearest neighbor clustering. As intuitive as the idea of clustering sounds, these methods are not well-suited for fraud detection in most scenarios. K-means clustering, for example, divides all data points, e.g., user accounts, into K clusters such that each data point belongs to the cluster with the mean that's closest to this data point. Such clustering algorithms, however, suffer from two fundamental drawbacks: first, they are notoriously computationally expensive to compute; and second, well-formed clusters do not necessarily mean there exists deceptive behavior. For example, user accounts applied from a certain region during a given time period can form a cluster, but calling this fraud on its own would lead to false positives.

As illustrated above, it is challenging to design an effective fraud detection system with unlabeled data. However, through automated feature analysis on the cluster level, together with big-data technology, this specification describes a fraud detection system that can automatically detect suspicious users accounts in scale without labels.

In general, one innovative aspect of the subject matter described in this specification can be embodied in methods that include the actions of partitioning a feature space into a plurality of sub feature spaces, wherein the feature space comprises features associated with user account events for an online service; generating one or more clusters of users for each of one or more sub feature spaces; comparing a feature profile of one or more of the clusters with a global feature profile to determine features of one or more the clusters that have concentrated key values that exceed a respective threshold value; for each of the one or more clusters, scoring the cluster including aggregating the degree to which the key values for features exceed the corresponding threshold values; and based on the scores of the one or more clusters, determining one or more fraud detection actions.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The one or more sub feature spaces are selected based on an examination of each feature sub space and selecting the one or more sub feature spaces based on the examination. The selecting one or more sub feature spaces includes calculating a Partitioning Power Index (PPI) of individual features and combined features in each sub feature space. The PPI is configured such that more fine-grained features tend to have a higher PPI value and that features with a highly concentrated distribution tends to have a lower PPI value. Calculating PPI includes one or more of determining a number of distinctive feature values, or "cardinality" or determining a total proportion of a top three key values, or "top3sum," wherein cardinality captures whether a feature distribution is fine-grained or coarse-grained, while top3sum captures a skewness of a distribution.

A profile for a particular cluster comprises a distribution of feature key values for all features in the cluster, and wherein the global profile comprises feature distributions among all, or a set of known, good users. Comparing feature distributions comprises using a negative binomial distribution to model the global feature distribution. Comparing the feature distributions comprises setting up a dynamic cutoff value for a given cluster and a given feature. The dynamic cutoff is specified based on a size of the cluster and the PPI of the feature. In response to determining that a cluster has one or more features such that these features all have highly concentrated key values that exceed their corresponding threshold values determining that the cluster is a suspicious cluster.

Scoring a particular cluster includes summing up the amounts by which features' top key values exceed the corresponding thresholds. The score calculation for a cluster factors both a number of features being triggered and the amount by which a key value concentration exceeds the threshold. The final score of a cluster is the sum of all positive overhead amounts after filtering out correlated features and adjusting for a detective power of each feature. The method further includes calculating a user suspiciousness score for a particular account of the online service based on a highest score calculated for a cluster among the clusters that the user account is associated with.

The subject matter described in this specification can be implemented in particular embodiments so as to realize one or more of the following advantages. Computational processing load can be reduced during fraud detection by generating more accurate clusters. Accuracy of fraud detection can be improved by better identifying clusters. No human intervention is required throughout the whole detection process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Automatic Sub-Feature Space Selection

An automatic fraud detection system uses campaigns to identify coordinated attacks. A campaign can include of one or more clusters of bad users. Thus, the first step is to efficiently create user clusters that will be used later for detection. Generating such clusters is not trivial, since a naive method, such as clustering users by their registered gender type, will fail to generate clusters that correspond to real attacks. Too many ill-formed clusters will also waste precious computing resources during the detection process.

Given that a typical online service can be associated with tens of thousands of features, the potential feature space is vast in terms of dimensionality. In some implementations, features are derived from network events by user accounts of the online service. Feature can, for example, be associated with network events, e.g., IP address, or profile information, e.g., e-mail address, for accounts of the online service.

Even if the system only considers single features when separating users, a "brute-force" implementation that tries every feature is overwhelming or impractical. Furthermore, "the curse of dimensionality" dictates that if the system considers multiple feature sets, there would be hundreds of millions of potential candidate feature sets. Therefore, having an effective way to select features from an immense feature space so as to generate meaningful clusters is critical to effective online fraud detection.

The approach used by the detection system described in this specification is to first identify features with a high partitioning power. For example, an IP address feature often has high partitioning power, since it tends to come from a wide range of values and typically does not concentrate on one specific address overwhelmingly. At a high level, the partitioning power of a feature is a single value between 0 and 1 that captures the cardinality, representing a number of distinctive key values for a discrete variable, and skewness of the feature's distribution. A feature with high partitioning power tends to have a more dispersed distribution where no single key value for the feature is overly dominant compared to other key values of the feature. When such features are used to cluster user accounts based on each user account's key value, they tend to generate clusters formed solely by malicious user accounts. The system quantifies such partitioning power using an index attached to each feature referred to in this specification as a Partitioning Power Index, or PPI in short.

Figure 1:
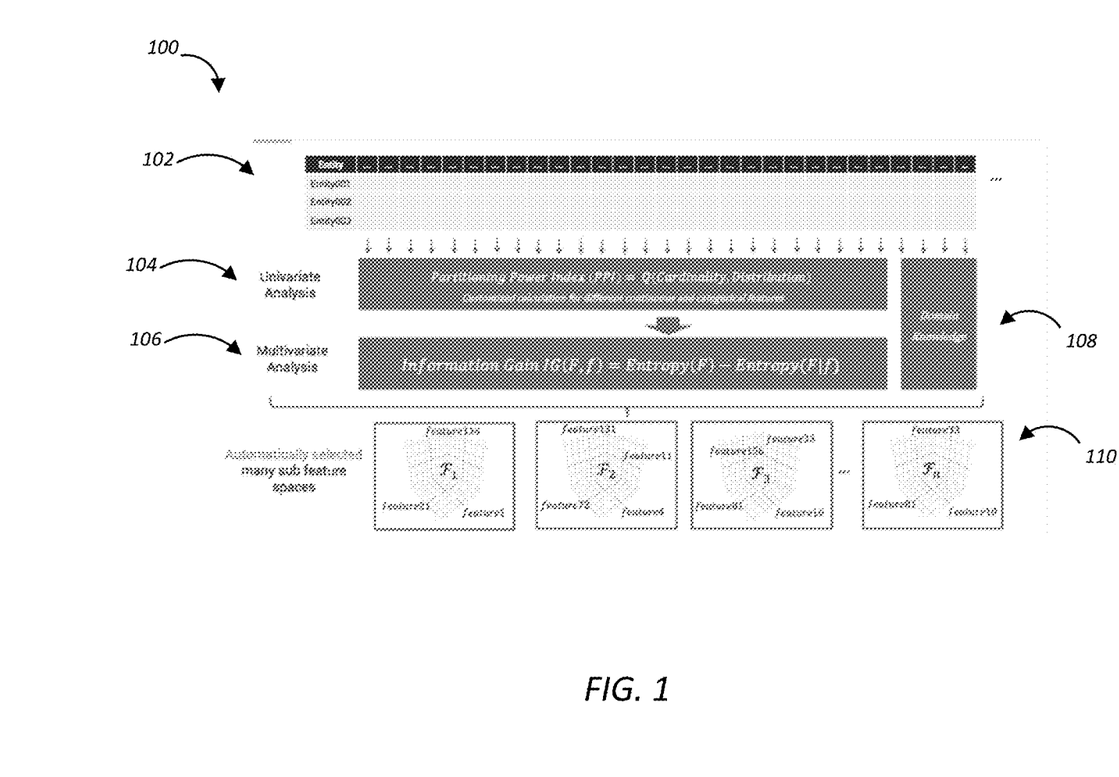
FIG. 1 is a diagram illustrating an example of a core detection system.

FIG. 1 is a diagram 100 illustrating an example of how the system works from a theoretical perspective. Given user accounts (or other types of entities) 102, the system first carries out a univariate analysis 104. During univariate analysis, the system concentrates on individual features that have high partitioning power and are thus suitable for clustering. Next, the system conducts a multivariate analysis 106 by focusing on individual campaigns/clusters. Through considering the global feature distribution "f", the system is able to shed new light on the cluster distribution F, as is described in detail below. This could be viewed as a kind of information gain when measuring information contained in f and F by the standard entropy measure. The system also uses domain knowledge 108 by specifying certain keyword value as "suspicious" or "unsuspicious" when such information is available. As a result, the overall system automatically partitions the total feature space into sub feature spaces 110 through clustering and studies each subspace in the multivariate analysis phase.

The concept of PPI can be further extended to multiple feature dimensions, meaning two or more features are selected to form a sub feature space. In this case a set of user accounts will be clustered together if they share unique or similar combined key values under the sub feature dimensions. Combined PPI in this case provides guidance as to the selection of cluster feature types and thus to the cluster procedure in general.

To efficiently select features that could be used as sub-space features, the system examines each feature based on a global user portfolio randomly sampled from all user account records. Two measures are computed for each feature: (i) a number of distinctive feature values, or "cardinality", and (ii) a total proportion of the top three key values, or "top3sum". Cardinality captures whether a feature distribution is fine-grained or coarse-grained, while top3sum captures the skewness of the distribution. Generally speaking, using a feature that has low cardinality tends to generate very large clusters with too many user accounts, and therefore less useful for the purpose of fraud detection. On the other hand, even if a feature has many distinctive key values in the global portfolio, the distribution could still just concentrate on a few, or even one single key value, again rendering such features not ideal as sub-space features.

The concept of partitioning power can be represented by the following formula:

$$PPI = \tan h(0.5*(1-\text{top3sum})*\log_{10}(\text{cardinality})),$$

where tan h is the hyperbolic tangent function that always returns a number between 0 and 1 for any positive input. By design, PPI is increasing in cardinality, meaning that more fine-grained features tend to have higher PPI value; PPI is decreasing in top3sum, meaning that a feature with highly concentrated distribution tends to have low PPI. For the corner case where the cardinality is less than or equal to three, thus top3sum not well-defined, the system is configured to set its PPI to zero.

Figure 2:
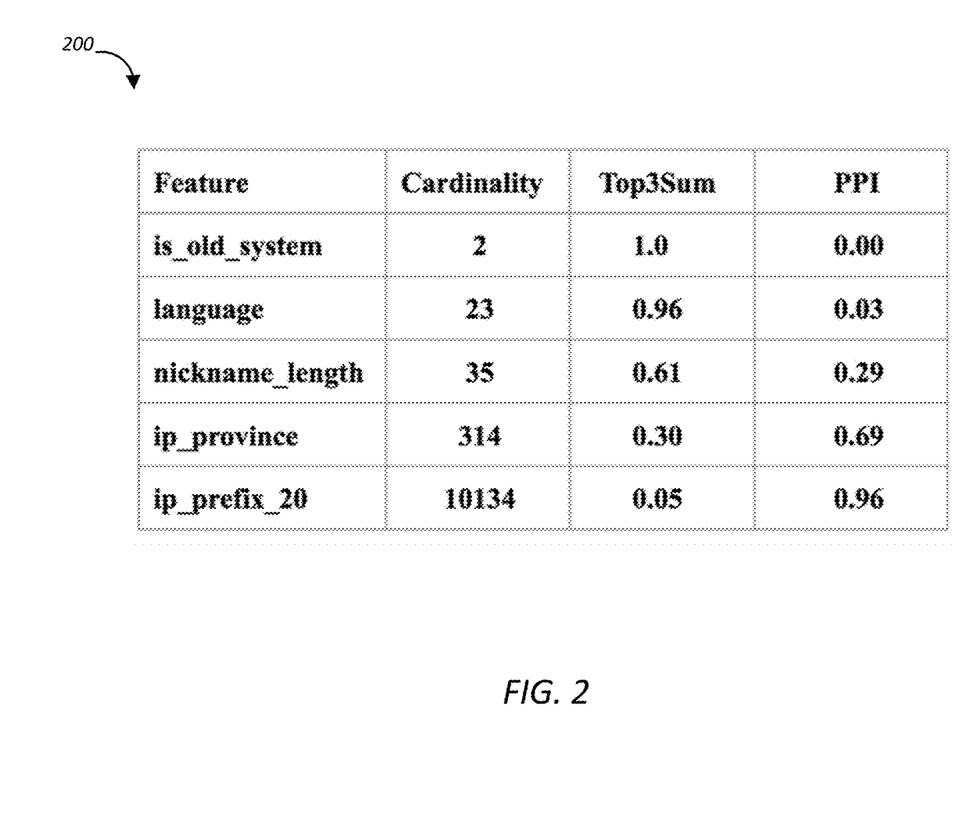
FIG. 2 is a table that contains sample feature distribution measures.

FIG. 2 contains a list of features 200 with their respective cardinality, top3sum, and PPI from sample data.

Automatic Detection

After automatically forming user feature sub spaces based on PPI, the system detects fraudulent clusters by comparing each cluster's profile with that of the global profile. In other words, a sub space is associated with a sub set of features. These features have particular values including key-values. Moreover, the feature values are associated with respective user account from which the features were extracted. Thus, users can be clustered within a feature sub space, e.g., based on features or key-values shared by users.

A cluster corresponds to a feature sub space, e.g., by clustering users having features in the feature sub space, for example by key-values of a particular feature associated with respective users. A cluster profile includes the distribution of feature key values for all features among this cluster, while the global profile includes feature distributions among all users. The global profile contains fundamental information about feature key values. At a high level, if a key value is rarely seen in the global profile but is dominant in a certain cluster, it raises a red flag as potentially containing fraudulent user accounts. For example, a group of 100 users can all have the same registration email account "JohnS0712@gmail.com". By itself this email account does not look suspicious at all. But the fact that all the users in this group share the same email account, while in the global profile "JohnS0712@gmail.com" is not common at all (besides users in this group) raises serious red flag for this group.

Directly comparing the feature distributions of the current cluster with that of the global profile can generate false signals. In a rather trivial example, a cluster with ten users can have at most ten different key values for any given feature, say, device id. But at the global level there can be millions of different device-id values and the difference of the two distributions measured in the common way can lead to misleading results.

To resolve this, the detection system has a new framework using both mathematical theory and empirical observation. The mathematical theory originates from the fact that most features in fraud detection datasets have a long-tail distribution. In other words, unlikely in the traditional world where a feature has only a few highly concentrated key values and the rest with rapidly diminishing shares, it's more common in reality that a feature has many key values and none is dominant. To accommodate this fact the system uses negative binomial distribution, a distribution known to fit long-tail data well, to model the global feature distribution.

This empirical observation captures two general phenomena in fraud detection. First, if a large cluster of users all share the same key value for a given feature, while this key value is not particularly common in global profile, this cluster tends to be suspicious. Although a small cluster, say, a cluster of three, can easily have the same user agent value, having three hundred users in a cluster all sharing the same user agent value could be a red flag (as long as the subspace is not generated by device-related features). Second, if a feature has high partitioning power, or PPI value, and for a given cluster its distribution highly concentrates on a not-so-common-globally key value, it tends to more suspicious if the same thing happens for a low PPI feature. One example would be ip-address, as the high PPI feature, vs language, as the low PPI feature.

These two empirical observations are incorporated into the parameters of the global negative binomial distribution; the percentile curves derived from the distribution are used as benchmarks to decide if a cluster should be detected.

To detect bad user clusters, the system first looks for highly concentrated key values across features for this cluster. This can include comparing feature profiles of the sub space feature by feature (e.g., comparing values of a feature in the sub space to values of the feature in the global profile). As discussed before, fraudsters acting in scale cannot avoid leaving traces: the traces are expressed as the majority of them in a given cluster sharing the same value on certain features. However, simply requiring that cluster concentration exceeds a constant value won't work here. For example, using an assumption that a cluster of ten users should be detected as fraud because all ten of them share the same user agent value, the system will have ignored the possibility that such user agent value is very common in the global portfolio, and therefore having all ten with the same value provides little evidence for the suspiciousness of the current cluster.

To resolve such possibilities, the system uses a dynamic cutoff value for a given cluster and a given feature. Rather than checking if the most concentrated key value has share exceeding a constant threshold, say 0.85, the system computes a dynamic threshold line that varies between 0 and 1.0 using negative binomial distributions. For example, if a key value is shared by all nine out of the ten users in a cluster, the system computes the threshold value corresponding to this key value: if this key value has a large share, thus is very common in the global profile, the triggering threshold could be very high, maybe even 100% (meaning never triggered). In this case having 90% of users in the given cluster is not a warning sign for fraud. If this key value is rather uncommon, and has very small share in the global portfolio, the corresponding threshold could be lower, say, at the level of 60%. In this case the 90% concentration in that cluster provides ample evidence to warn against this cluster. Having a global perspective in this case provides insight into each individual cluster that the system won't have otherwise.

When setting up the dynamic scheme, the system also takes into account two more factors: (i) the size of the cluster and (ii) the PPI of the feature. Both of these two factors are given the ability to shift the dynamic threshold curve further. Such considerations make the detection more effective because having a large cluster all sharing a globally not-so-common feature value is more suspicious than a smaller cluster doing so. Similarly, having a cluster with a high PPI feature that exhibits high concentration, say client ip, is more suspicious than having the same cluster with a low PPI feature that exhibits high concentration, say device type.

Figure 3:
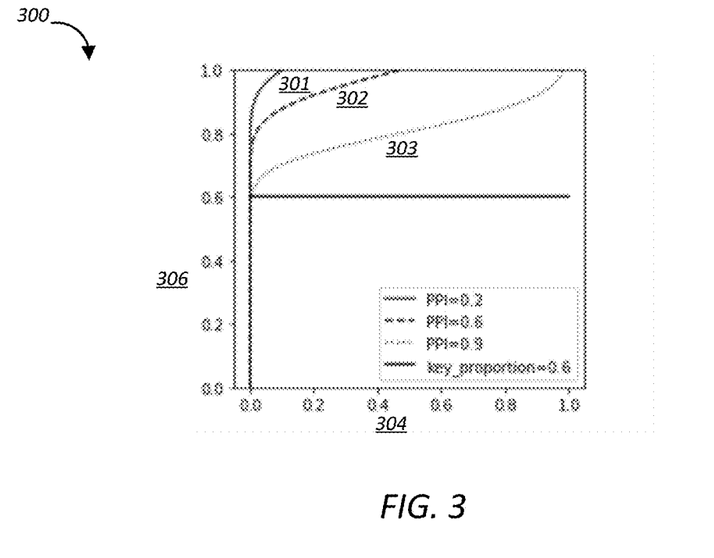
FIG. 3 is a diagram illustrating an example of dynamic threshold curves.

FIG. 3 is a diagram 300 illustrating dynamic threshold curves for particular example PPI values 0.2 (301), 0.6 (302) and 0.9 (303). The dynamic threshold curves are plotted with respect to a horizontal axis (304) representing a share/proportion of a particular key value in the global distribution and a vertical axis (306) representing the share/proportion of the same key value in the current group being evaluated. Here as the PPI value increases from 0.2 to 0.9, the threshold curves shift to the right. Consider a cluster for which the largest key share for both "ip_country" (with PPI 0.2) and "ip_prefix_20" (with PPI 0.9) are 0.85. Intuitively, a concentration of 0.85 for a high PPI feature that has very dispersed distribution is more suspicious for that for a low PPI feature with more concentrated key values. The system captures this intuition by shifting the threshold curve, which is the minimum level of group concentration for us to deem a feature suspicious for a given cluster.

At the end of this detection phase the system can have a set of features for each cluster such that these features all have highly concentrated key values that exceed their appropriate threshold values. The next phase, aggregating cluster level results, determines the final badness of a cluster.

Automatic Cluster Level Aggregation

Figure 4:
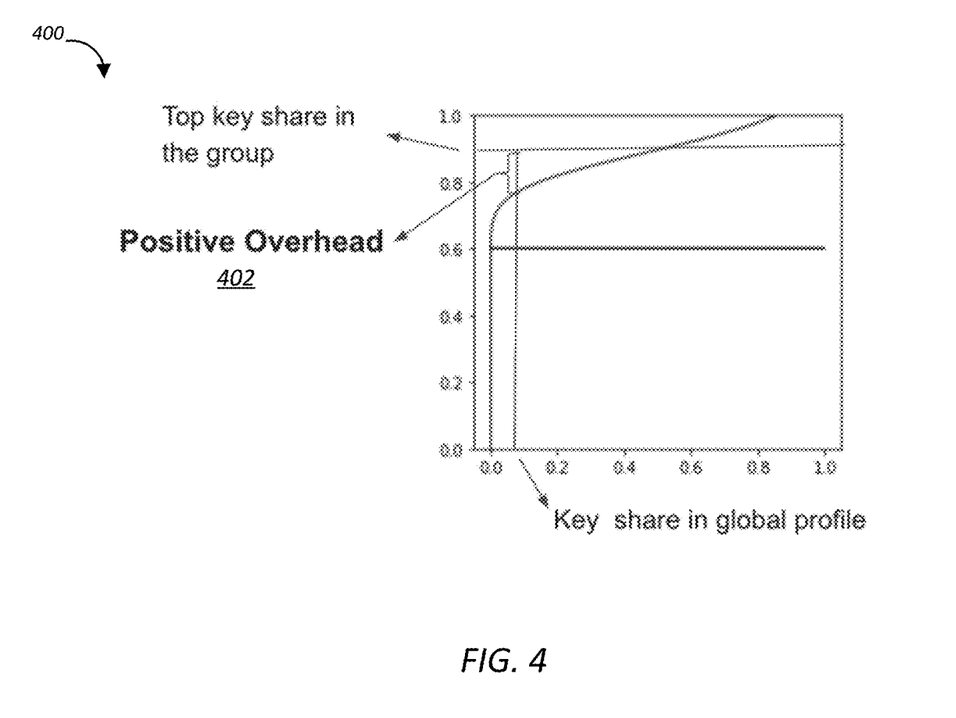
FIG. 4 illustrates an example of a difference between key value concentration and the dynamic threshold.

For a given cluster the system computes its final badness score by summing up the amounts by which features' top key values exceed the corresponding dynamic thresholds. This takes into account that a cluster with many features being triggered, everything else being equal, should be more suspicious than a cluster with only a few features triggered. The amount by which a key value concentration exceeds the dynamic threshold also matters because the higher the amount, the more uniform the distribution, and thus the more suspicious the cluster. FIG. 4 is a diagram 400 that illustrates this difference between key value concentration and the dynamic threshold for a triggered feature and calls it "Positive Overhead" (402).

As the difference between top group key share (the largest key value share for a feature on a cluster) and the cutoff value on the threshold curve (the minimum value in group concentration to be deemed suspicious for given global profile value), the positive overhead provides a quantitative measure of the badness for a given feature. The final cluster score is the sum of all the positive overhead amounts after filtering out correlated features and adjusting for the detective power of each feature.

Since a user could belong to multiple clusters, the cluster level scores are further used to obtain a user level score, where a user's score is the highest cluster score among all the clusters this user belongs to. The detection system works together with the rest of an integrated pipeline as illustrated by FIG. 5.

Figure 5:
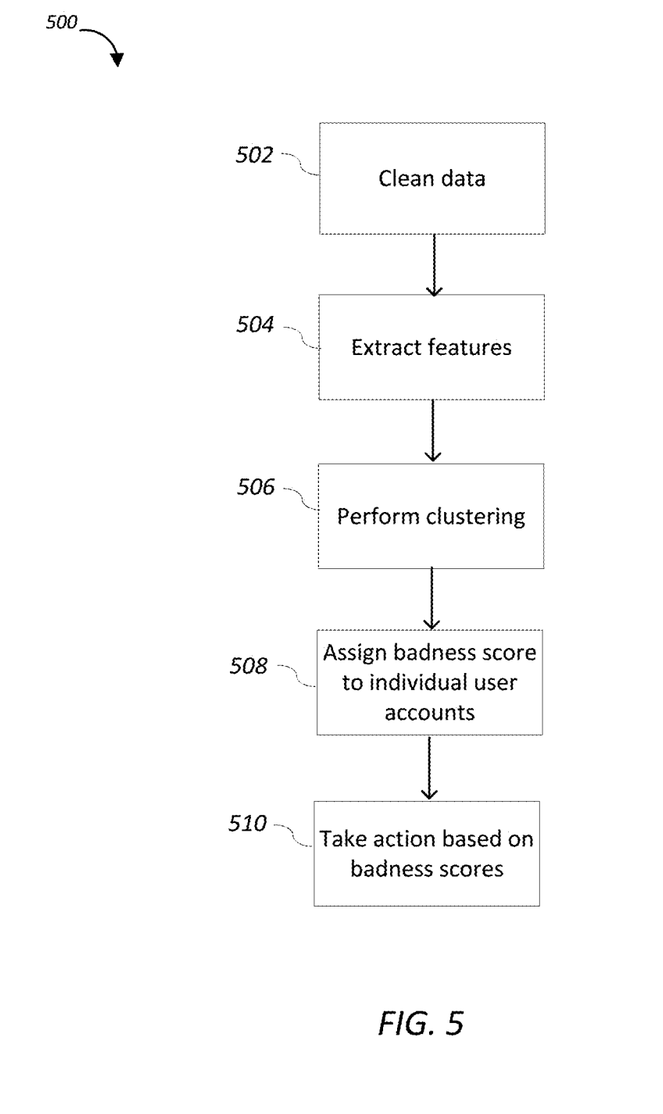
FIG. 5 is a flow diagram illustrating an example of fraud detection.

FIG. 5 is a flow diagram 500 illustrating an example of fraud detection. Starting from raw user account information, e.g., a collection of user account events, the system first uses feature engineering to clean up the data and extract useful features (502). Feature extraction techniques for both structured and unstructured data can be applied to obtain features from the raw user account information (504). The output from this step is then used as input to the automatic detection system, going through the first phase of clustering and the second phase of cluster-level detection (506). The system then aggregates all the users that have belonged to at least one bad group and assign the highest group-level badness score to individual user accounts (508). Based on the badness scores, different actions can be taken (510). For example, the badness score can be compared to a threshold value. If the badness score exceeds the threshold value, the system can take further action including, for example, blocking access by the account to a particular online service or flagging/suspending the account pending human administrator follow-up.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for fraud detection comprising:
partitioning a feature space into a plurality of sub feature spaces, wherein the feature space comprises features associated with user account events for an online service;
generating one or more clusters of users for each of one or more sub feature spaces;
comparing a feature profile of one or more of the clusters with a global feature profile to determine features of one or more the clusters that have concentrated key values that exceed a respective threshold value;
for each of the one or more clusters, scoring the cluster including aggregating the degree to which the key values for features exceed the corresponding threshold values; and
based on the scores of the one or more clusters, determining one or more fraud detection actions.

2. The method of claim 1, wherein the one or more sub feature spaces are selected based on an examination of each feature sub space and selecting the one or more sub feature spaces based on the examination.

3. The method of claim 2, wherein the selecting one or more sub feature spaces comprises calculating a Partitioning Power Index (PPI) of individual features and combined features in each sub feature space.

4. The method of claim 3, wherein the PPI is configured such that more fine-grained features tend to have a higher PPI value and that features with a highly concentrated distribution tends to have a lower PPI value.

5. The method of claim 3, wherein calculating PPI comprises one or more of determining a number of distinctive feature values, or "cardinality" or determining a total proportion of a top three key values, or "top3 sum," wherein cardinality captures whether a feature distribution is fine-grained or coarse-grained, while top3 sum captures a skewness of a distribution.

6. The method of claim 1, wherein a profile for a particular cluster comprises a distribution of feature key values for all features in the cluster, and wherein the global profile comprises feature distributions among all, or a set of known, good users.

7. The method of claim 6, wherein comparing feature distributions comprises using a negative binomial distribution to model the global feature distribution.

8. The method of claim 6, wherein comparing the feature distributions comprises setting up a dynamic cutoff value for a given cluster and a given feature.

9. The method of claim 8, wherein the dynamic cutoff is specified based on a size of the cluster and the PPI of the feature.

10. The method of claim 1, wherein in response to determining that a cluster has one or more features such that these features all have highly concentrated key values that exceed their corresponding threshold values determining that the cluster is a suspicious cluster.

11. The method of claim 1, wherein scoring a particular cluster comprises summing up the amounts by which features' top key values exceed the corresponding thresholds.

12. The method of claim 11, wherein the score calculation for a cluster factors both a number of features being triggered and the amount by which a key value concentration exceeds the threshold.

13. The method of claim 12, wherein the final score of a cluster is the sum of all positive overhead amounts after filtering out correlated features and adjusting for a detective power of each feature.

14. The method of claim 1, further comprising calculating a user suspiciousness score for a particular account of the online service based on a highest score calculated for a cluster among the clusters that the user account is associated with.

15. A system comprising:
one or more computers and one or more storage devices storing instructions that are operable, when executed by the one or more computers, to cause the one or more computers to perform operations comprising:
partitioning a feature space into a plurality of sub feature spaces, wherein the feature space comprises features associated with user account events for an online service;
generating one or more clusters of users for each of one or more sub feature spaces;
comparing a feature profile of one or more of the clusters with a global feature profile to determine features of one or more the clusters that have concentrated key values that exceed a respective threshold value;
for each of the one or more clusters, scoring the cluster including aggregating the degree to which the key values for features exceed the corresponding threshold values; and
based on the scores of the one or more clusters, determining one or more fraud detection actions.

16. The system of claim 15, wherein the one or more sub feature spaces are selected based on an examination of each feature sub space and selecting the one or more sub feature spaces based on the examination.

17. The system of claim 16, wherein the selecting one or more sub feature spaces comprises calculating a Partitioning Power Index (PPI) of individual features and combined features in each sub feature space.

18. The system of claim 17, wherein the PPI is configured such that more fine-grained features tend to have a higher PPI value and that features with a highly concentrated distribution tends to have a lower PPI value.

19. The system of claim 17, wherein calculating PPI comprises one or more of determining a number of distinctive feature values, or "cardinality" or determining a total proportion of a top three key values, or "top3 sum," wherein cardinality captures whether a feature distribution is fine-grained or coarse-grained, while top3sum captures a skewness of a distribution.

20. The system of claim 15, wherein a profile for a particular cluster comprises a distribution of feature key values for all features in the cluster, and wherein the global profile comprises feature distributions among all, or a set of known, good users.

21. The system of claim 20, wherein comparing the feature distributions comprises setting up a dynamic cutoff value for a given cluster and a given feature.

22. The system of claim 15, wherein in response to determining that a cluster has one or more features such that these features all have highly concentrated key values that exceed their corresponding threshold values determining that the cluster is a suspicious cluster.

23. The system of claim 15, wherein scoring a particular cluster comprises summing up the amounts by which features' top key values exceed the corresponding thresholds.

24. The system of claim 23, wherein the score calculation for a cluster factors both a number of features being triggered and the amount by which a key value concentration exceeds the threshold.

25. The system of claim 15, further comprising calculating a user suspiciousness score for a particular account of the online service based on a highest score calculated for a cluster among the clusters that the user account is associated with.

26. One or more non-transitory computer-readable storage media encoded with instructions that, when executed by one or more computers, cause the one or more computers to perform operations comprising:

partitioning a feature space into a plurality of sub feature spaces, wherein the feature space comprises features associated with user account events for an online service;

generating one or more clusters of users for each of one or more sub feature spaces;

comparing a feature profile of one or more of the clusters with a global feature profile to determine features of one or more the clusters that have concentrated key values that exceed a respective threshold value;

for each of the one or more clusters, scoring the cluster including aggregating the degree to which the key values for features exceed the corresponding threshold values; and based on the scores of the one or more clusters, determining one or more fraud detection actions.

\* \* \* \* \*